United States Patent [19]

Taketani

[11] 4,074,402
[45] Feb. 21, 1978

[54] PIPE CLAMP
[75] Inventor: Osamu Taketani, Tokyo, Japan
[73] Assignee: Nippon Steel Corporation, Tokyo, Japan
[21] Appl. No.: 615,083
[22] Filed: Sept. 19, 1975
[30] Foreign Application Priority Data
Sept. 25, 1974  Japan ................................ 49-109604
[51] Int. Cl.² ............................................ B65D 63/00
[52] U.S. Cl. ...................................................... 24/268
[58] Field of Search .................................... 24/268, 26

[56] References Cited
U.S. PATENT DOCUMENTS

| 146,207 | 1/1874 | Schneider | 24/268 |
|---|---|---|---|
| 1,183,767 | 5/1916 | Radtke | 24/25 |
| 2,345,832 | 4/1944 | Pritchard | 24/274 P |
| 2,627,635 | 2/1953 | Seltzer | 24/268 |
| 2,778,085 | 1/1957 | Bernard | 24/268 |
| 3,587,142 | 6/1971 | Scaravelli | 24/268 |
| 3,797,383 | 3/1974 | Sturm | 24/268 |

FOREIGN PATENT DOCUMENTS

| 832,716 | 1/1970 | Canada | 24/268 |
|---|---|---|---|
| 992,116 | 5/1965 | United Kingdom | 24/268 |

Primary Examiner—Paul R. Gilliam
Assistant Examiner—Victor N. Sakran
Attorney, Agent, or Firm—Wenderoth, Lind & Ponack

[57] ABSTRACT

In a pipe clamp composed of a plurality of arc-shaped bands, which can be assembled into a circular shape, and each of which is provided with coupling portions on the outsides of its both ends, characterized by the followings: the coupling portions of said plural bands on one side are provided with band clamping portions, which can be clamped with bolts and nuts, and the other coupling portions excepting the aforesaid clamping portions are provided as the coupling portions consisting of ear plates fixed on the outside of the end portion of each band and a clip engaged with said ear plates.

2 Claims, 6 Drawing Figures

PIPE CLAMP

BACKGROUND OF THE INVENTION

The present invention relates to a pipe clamp, and more particularly to a pipe clamp for securing and fixing a pipe with a large diameter used for an oil pipe line, etc.

For example, when a pipe line is to be laid some distance from the ground, supporting members on which the pipes are mounted are erected on the ground, but pipe clamps are required to secure the pipes to said supporting members. Said pipe clamps, sometimes, serve the role of a pipe joint, which wrap up the coupling portion when the pipes are to be coupled. Such a connecting method is mainly used when concrete pipes or cast pipes are coupled. Furthermore, when some damage is found in a pipe after a pipe line is laid, and the pipe of the damaged pipe line is required to be replaced with a new pipe, the pipe clamps are used to secure the pipes, in which case the end portion of the new pipe and the end part of the installed pipe are abutted on each other, and two pipe clamps are used to secure the pipes by sandwiching the jointed part then, a full-circled welding is performed.

A typical example of the pipe clamp provided for such various practical purposes is shown in FIG. 1. The pipe clamp is composed of two semi-circular bands 11 and 12, and flanges 14 having ribs 13 are fixed to the outsides of the end portions of the bands 11 and 12 a plurality of holes for bolts are formed in the flanges 14. When the pipe clamp is used to fasten pipe, the bolts put through the holes in the opposed flanges 14 of the semi-circular bands 11 and 12 sandwiching the pipe and nuts are used to fasten and clamp said pipe.

However, to use a large number of bolts and nuts in clamping the pipe means that the clamping operation requires a lot of time and work, and when viewed from a standpoint of workability, it is by no means effective. As the diameter of pipe increases in its size, the number of divided sections of the pipe clamp increases, which will be more than two. Consequently, pipe clamp fastening portions are also increased accordingly in number and the workability goes from bad to worse. Furthermore, when the clamping has to be made at more than two portions, it becomes difficult to uniformly maintain the mutual clamping forces. That is, it is very difficult, from a practical of view, to maintain all the clamping forces uniform in the plural clamping portions of the pipe clamp by clamping operations using only bolts and nuts. Moreover, there are cases where a slippage results between the upper and lower bands due to some reason or another when the pipe clamp is being fastened or after the clamping is completed, but there is no provision for means of adjusting the slippage in the conventional pipe clamp.

SUMMARY OF THE INVENTION

An object of this invention is to provide a pipe clamp that eliminates the aforesaid drawbacks of the conventional clamp and performs the clamping operation extremely efficiently without requiring much work or time.

Another object of the invention is to provide a pipe clamp with which a uniform clamping force can be easily obtained in the circumferential direction of the pipe.

A further object of this invention is to provide a pipe clamp with which a favorable clamping force can be obtained through bolt fastening work only at one place even when a pipe clamp has more than two clamping portions.

A still further object of the present invention is to provide a pipe clamp having engaging portions which are simple and sturdy in their structures, and perform adequate clamping.

In the pipe clamp consisting of plural arc-shaped bands having mutual coupling portions on the outsides of their end portions, and which can be assembled into a circular shape, these and other objects have been accomplished by a pipe clamp characterized in that one of said plural coupling portions is made as a clamping portion which can be fastened by bolt and nut, and the remaining other coupling portions excluding the aforesaid coupling portion are composed of ear plates fixed to the outside of the end portion of each band and a clip which engages simultaneously with the opposed ear plates of the upper and lower bands.

DESCRIPTION OF PREFERRED EMBODIMENT

Figure 1:
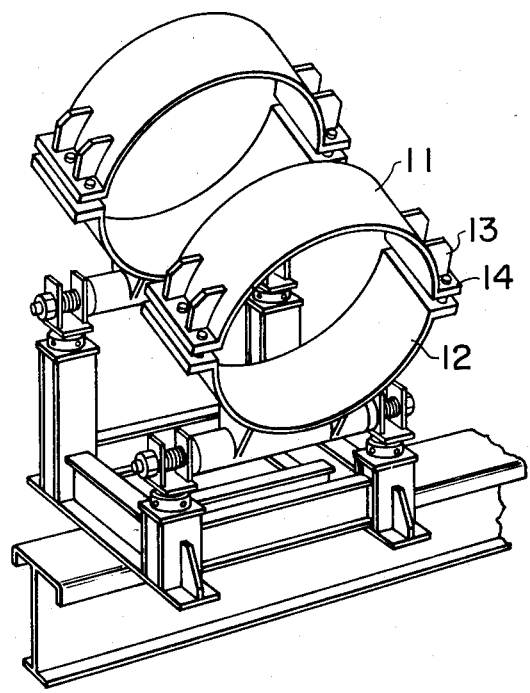
FIG. 1 is a perspective view representing an example of the conventional pipe clamp.
Figure 2:
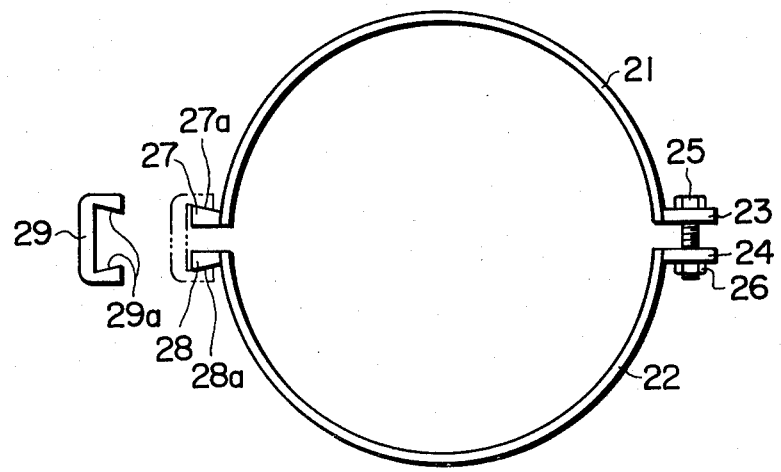
FIG. 2 is a front elevation showing one example of the pipe clamp of the present invention.

The pipe clamp of the present invention shown in FIG. 2 is composed of two semi-circular bands 21 and 22. Flanges 23 and 24 are fixed to the outsides of the end portions (right end) of said semi-circular bands 21 and 22, and a plurality of bolts 25 are put through said flanges 23 and 24 and screwed into nuts 26. The structure of the clamping portion of the pipe clamp to be fastened with bolts and nuts is the same as that of the conventional one. Ear plates 27 and 28 are fixed to the outsides of the other ends (left end) 21 and 22 of the semi-circular bands, and the back surface (upper surface) of one 27 of the ear plates is provided with a slant face 27a sloped upwardly towards the outer direction. The back surface (under surface) of the other ear plate 28 is provided with a downwardly slanted face 28a corresponding to the aforesaid slant face 27a. A clip 29 is provided to couple both of the opposed ear plates 27 and 28 mutually when these upper and lower semi-circular bands 21 and 22 are assembled into a circle. A dovetail groove, into which the ear plates 27 and 28 are fitted, is formed in the clip 29. The side faces 29a of the grooved portion are sloped corresponding to the slant faces 27a and 28a of the ear plates 27 and 28.

FIG. 3, FIG. 4, FIG. 5, FIG. 6 and FIG. 7 show the deformed examples of the ear plate and the clip shown in FIG. 2, and even these examples have adequately accomplished the objects of the insant invention.

Figure 3:
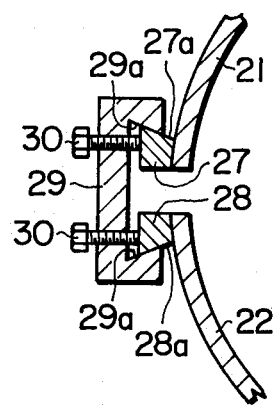
FIG. 3, FIG. 4, FIG. 5, FIG. 6 and FIG. 7 are partial sectional views showing various concrete examples of the coupling portions of the pipe clamp of the present invention.

FIG. 3 shows the condition where adjusting screws 30 are mounted on the back surface of the clip 29, and when the ear plates 27 and 28 are fitted in the clip 29, the tips of said adjusting screws 30 reach the top faces of the ear plates 27 and 28. An optional number of the adjusting screws 30 can be mounted in two rows in the longitudinal direction of the clip 29. The role of these adjusting screws 30 is to finely adjust the clamping condition of the pipe clamp, for example, when the fastening of the pipe clamp against the pipe is completed after the ear plates 27 and 28 are fitted in the clip 29. A slippage results where respective axial lines cross each other between the upper and lower semi-circular bands 21 and 22, said slippage can be eliminated by making a fine adjustment of the adjusting screws 30 in proper position.

Figure 4:
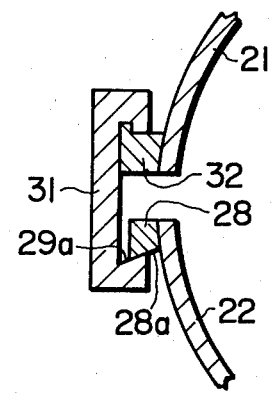

The clip 31 and one ear plate 32 (the other ear plate 28 is the same as FIG. 2) shown in FIG. 4 are different in their configurations from ones shown in FIG. 2. Said ear plate 32 is provided with a protruberant portion at the edge of its upper face, and a groove that fits on said protruberant portion is provided in the upper engaging portion of the clip 31 to be fitted on the ear plate 32. As shown in FIG. 4, when the groove is fitted on the protruberant portion, said portion does not easily disengage the groove. The groove can be respectively formed in the ear plate 32 and the protruberant portion can be formed on the clip 31, which are quite opposite to the example shown in the drawing.

Figure 5:
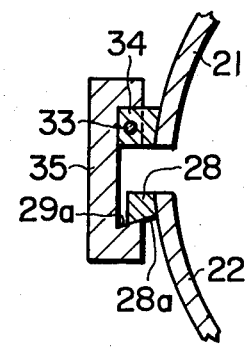

The example shown in FIG. 5 does not use the above-mentioned structure; a holding component such as the pin 33 is used to couple one ear plate 34 and the clip 35 and parts of the ear plate 34 and the clip 35 are overlapped like a hinge and are rotatably held by the pin 33.

Figure 6:
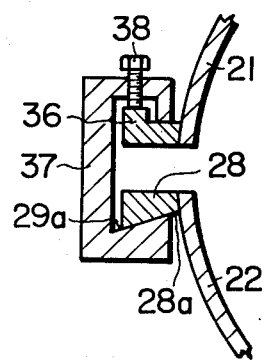

FIG. 6 shows an example in which the cross section of one ear plate 36 is formed in on L-shape and the upper engaging portion of the clip 37 is formed almost in the same shape corresponding to the ear plate 36. An adjusting screw 38 is mounted from the upper side of the clip 37, and its tip is in contact with the top surface of the ear plate 36 adjustment of the clamping force can be made by rotating said screw 38.

Figure 7:
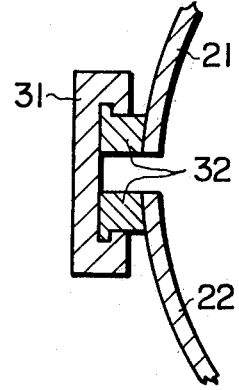

FIG. 7 shows an example in which the ear plate 32 provided with a slant face shown in FIG. 4 is used on both opposed sides.

As mentioned above, the ear plates and the clips related to the present invention can be varied in their configurations; however, the adoption of structure such as the one which will be mentioned below is required. That is, the opposed ear plates must be easily and solidly coupled in tightly contacting relationship without using bolts when a pipe clamp is to be fastened, and there must not be any fear of their coming apart after the completion of clamping. For said purposes, a combination of the ear plates and a clip formed with slant faces, a combination of the ear plates and a clip formed without such slant faces, or a combination of the ear plates and clip formed with partially slant faces can be considered. However, when the ear plates and the clip are not formed with slant faces, consideration should be given that the configurations of the clip or the ear plates should be specially formed ones, or holding members such as a pin should be used so that the clip does not easily come off the ear plates. In a combination of the ear plates and pin formed with slant faces, it is advantageous to cost and workability because the structure is simple, and furthermore, only one kind of clip and only one kind of the band are required. It is also advantageous because the directions of the members to be used do not cause any trouble. In the embodiments shown in drawings, the example using the clip formed with at least one slant face is shown. It goes without saying that a clip (no slant face is formed on the ear plate, either) formed with no slant face can be used.

The curvature of the semi-circular band composing the pipe clamp of the present invention is naturally determined to suit the diameter of a pipe on which said pipe clamp is used. The width of the pipe clamp in its axial direction can also be properly selected according to the purpose of use and the diameter of the pipe clamp. In the example of FIG. 2, two semi-circular bands 21 and 22, obtained by dividing a circle into two parts constitute a pipe clamp. As the pipe diameter increases in its size, the weight of the pipe clamp also increases, the pipe clamp, therefore, can be divided into more than three sections to facilitate hauling and (manufacturing). When the pipe is divided into more than three sections, the number of coupling portions of each arc-shaped band increases in proportion to the number of divisions. However, in the present invention, regardless of the increase in the number of coupling portions, the clamping portion to be fastened with bolts and nuts remains at one, and all of the remaining coupling portions are formed into structures using combinations of the ear plates and clips.

Though the ear plate 27 or 28 is welded to the outside of a semi-circular band, it is not necessarily required to provide the band 21 or 22 on the ear plate 27 or 28 over the entire width of said band, and short ear plates 27 can be provided at an interval between them. The length of the clip 29 is not also required to be matched with the width of the semi-circular band 21 or 22. The clip having the length matched with the narrowest band can be prepared beforehand and in case the width of the band is wider, more than two pieces of these clips 29 can be used by arranging them serially.

The material for the band, ear plate and clip used in this invention must be the one having a high rigidity such as steel.

The materials of the pipes, on which the pipe clamp of this invention is applied, should be well known materials such as steel, cast iron, or concrete pipes. As for pipe diameter, pipes with small diameters do not require the pipe clamp of this invention. The pipe clamp of the present invention can be properly used when a pipe diameter is above 12 inches.

Figure 8:
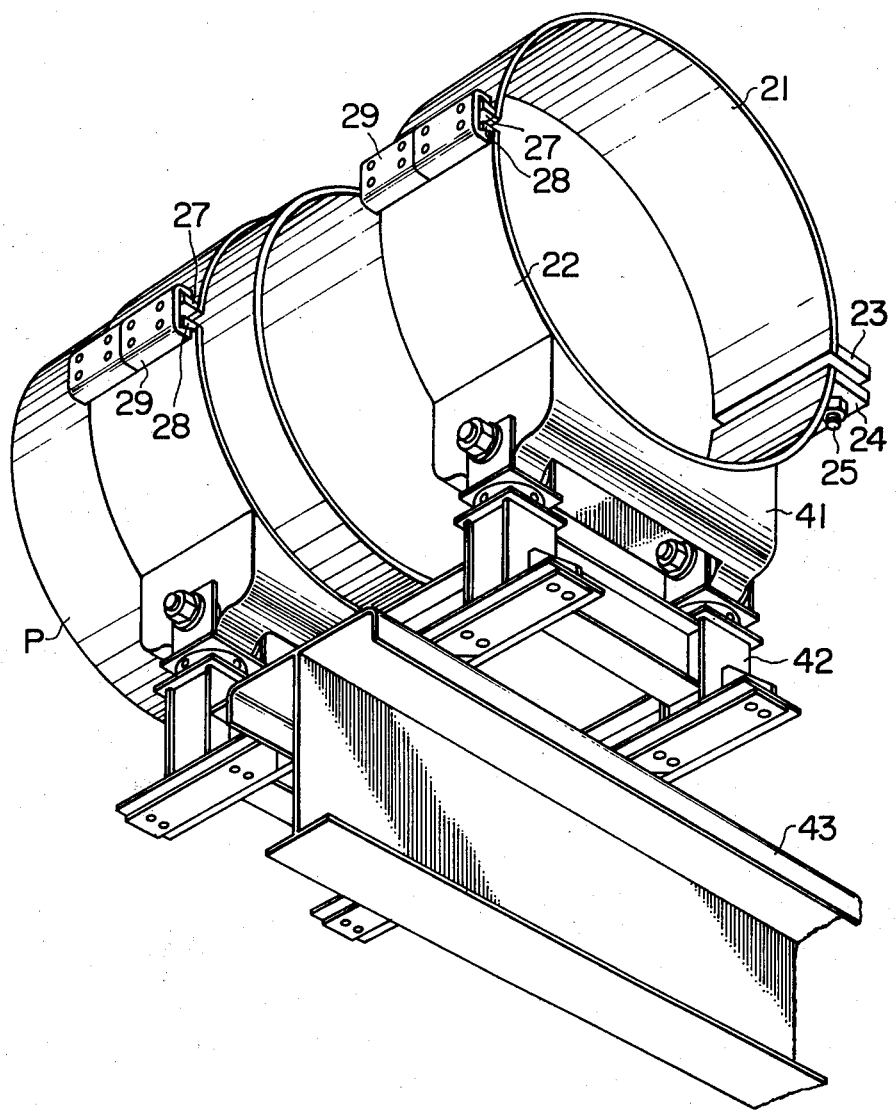
FIG. 8 is a perspective view of the pipe clamp of the present invention which is being used.

The usual conditions for employing the pipe clamb shown in FIG. 2 is described by referring to FIG. 8.

The lower semi-circular band 22 is fixed to a pipe clamp mounting base 41. The pipe clamp mounting base 41 is secured by the support beam 43 with interposition of the shoes 42. The upper semi-circular band 21 is placed on the pipe P after the pipe is placed on the lower band 22, and the grooved portion of the clip 29 is slid from the direction in parallel with the axial direction of pipe over the opposed ear plates 27 and 28 on one side of the pipe clamp. In the drawing, two clips are used in series. The flanges 23 and 24 on the other side are clamped with the plurality of bolts and nuts. As the fastening of bolts continues, the clip 29 goes deeper into the slant faces 27a and 28a of the ear plates 27 and 28, and the bottom portion of the clip 29 contacts the ear plates 27 and 28. If the fastening of the bolts is completed when said contact is made, the pipe clamp provides a uniform clamping force around the entire circumference of the pipe. As the clamping operation is completed with a clamping work only at one coupling portion per pipe clamp, the operation can be performed swiftly, and, furthermore, the pipe clamp clamps the pipe solidly and uniformly and secures the pipe positively.

What is claimed is:

1. A pipe clamp apparatus for clamping around the outer circumference of a pipe, said apparatus comprising:
   a plurality of arc-shaped bands circumferentially surrounding the outside of said pipe;
   first clamping projections integrally formed on the opposing longitudinal sides of at least two of said arc-shaped bands, each of said first clamping projections having a hole therethrough aligned with the hole through the other clamping projection;
   paired second clamping projections integrally formed on opposing longitudinal sides of at least two of said arc-shaped bands and extending at least partially along the length of said sides, each pair of said projections slanting outwardly away from the outer longitudinal surface of said bands at straight angles thereto and each projection being slanted in a direction opposite to the direction of the opposing projection of said pair of projections, each of said slanted projections having a slanted surface extending outward from said arc-shaped band and the longitudinal direction of said slanted surface being parallel to the longitudinal axis of said pipe surrounded by said arc-shaped bands;
   removable clip means having a groove therein, said groove having straight longitudinal sides formed at the same angles as said slant surfaces, fitted over each pair of said second clamping projections for tightly holding said slant surfaces of said second clamping projections therein; and
   bold and nut means fitted through said aligned holes in said first clamping projections for attaching and forcing said first clamping projections toward each other.

2. An apparatus as claimed in claim 1 wherein:
   said clip means has at least one hole therethrough opposite at least one of said second clamping projections over which said clip means is fitted; and
   further comprising fastening means fitted through said hole in said clip means against said second clamping projection for adjustably fastening said clip means to at least one of said clamping projections.

* * * * *